April 3, 1962    W. F. SKILLIN    3,028,169
SCROLL CHUCK
Filed June 22, 1960
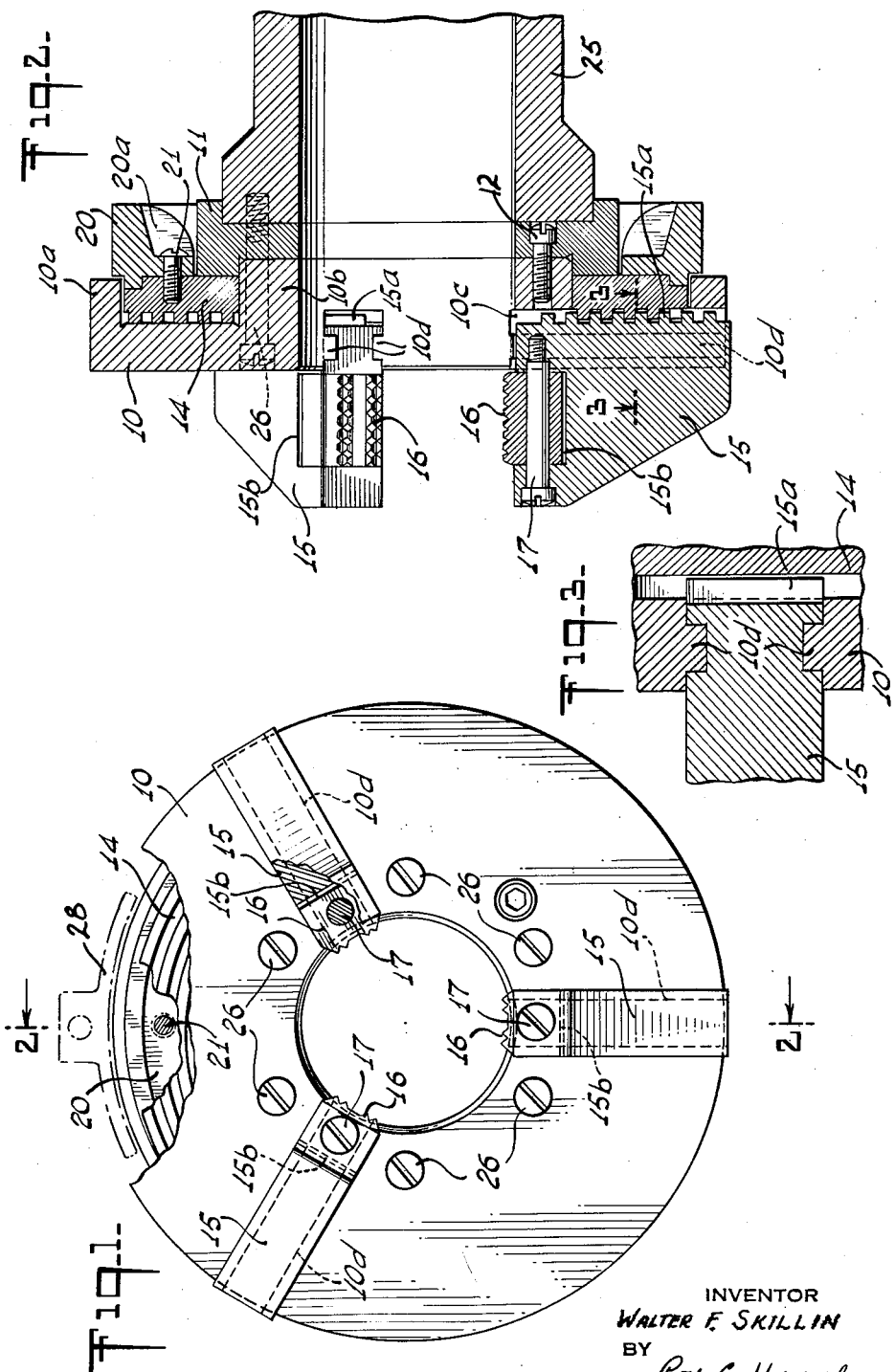
INVENTOR
WALTER F. SKILLIN
BY
Roy C. Hopgood
ATTORNEY 3,028,169
SCROLL CHUCK
Walter F. Skillin, New Britain, Conn., assignor to Union Manufacturing Company, New Britain, Conn., a corporation of Connecticut
Filed June 22, 1960, Ser. No. 37,918
4 Claims. (Cl. 279—114)

This invention relates to chucks, more particularly scroll chucks, for use on power driven spindles of lathes or other machines.

Chucks are usually constructed for manual opening or closing of their jaws, as by applying manual force through a wrench to the chucking mechanism. Other known types of chucks are designed for automatic operation of their jaws by an auxiliary system dependent on compressed air, or by a hydraulic system or an electrical system.

An object of the present invention is to provide a novel chuck as simple to manufacture and maintain as a manually operated chuck and yet substantially possessing the power advantage of an automatically operated chuck.

An object of the invention is to provide a chuck which will use the power of the machine spindle to actuate the chucking mechanism; that is, to actuate the gripping jaws of the chuck to open or closed status.

The novel chuck involves a chuck body or carrier movably mounting a plurality of grippers, at least two opposing grippers, for inward actuation to close down on an object and for outward actuation to release the object. Rotatively supported by the carrier is a threaded actuating device for the grippers, the actuating device and the grippers having meshed threads to cause the grippers to be actuated inwardly or outwardly upon relative rotation between the threaded actuating device and the carrier in one direction or the other. The invention features a friction brake surface or element connected to the machine head for engagement with a brake drum to apply frictional drag force to the brake element when adjustment of the grippers is desired. The applied drag force will retard or restrain the actuating device from following the rotation of the chuck body or carrier effected by the power driven spindle. The resulting relative rotation between the actuating device and the grippers will effect the inward or outward actuation of the grippers depending on the direction in which the machine spindle is turning. The closing or opening of the grippers with respect to an object or workpiece will thus be accomplished primarily under the power of the rotating machine spindle. The extent of braking power necessary to restrain the threaded actuating device from rotating along with the chuck body is comparatively small while the power of the spindle is continually serving to rotate the chuck body relative to the threaded actuating device, whereby with a simple rotation of the spindle in appropriate direction the grippers can be rapidly closed very firmly on an object by the power of the spindle. Likewise, the power of the spindle when rotating in reverse direction while the threaded actuating device is being braked will serve to effect rapid opening of the grippers.

The invention is particularly useful for a scroll chuck having a carrier or body composed of front and back parts fastened together to leave a space between them around the hub of the chuck body, a scroll gear being caged in this space and rotatively supported by the hub of the chuck body. The front part of the chuck body or carrier is formed equidistantly around its axis with radial guide slots in which the bodies of the grippers are slidably guided for radially inward or outward actuation. The backs of the grippers are provided with threads or teeth for engagement with the scroll thread on the front face of the scroll gear. The brake element will preferably be a brake drum or cylinder fastened to the back of the scroll gear.

Other objects of the invention may reside in any novel feature or combination of features which will appear from the following description, the claims, and the drawings.

In the drawings:

FIG. 1 is a front view of the chuck, partially broken away to show rear elements;

FIG. 2 is a vertical section substantially along line 2—2 of FIG. 1; and

FIG. 3 is a detail section along line 3—3 of FIG. 2.

In detail, the illustrative chuck has a chuck body or carrier comprised of front and back ring-like members 10 and 11. The front member 10 is formed with an outer peripheral flange 10a and an inner hub 10b. The front and back members 10 and 11 are fastened together by circumferentially spaced screws of which one screw 12 appears in FIG. 2. When fastened together, the two members leave an annular space between them around the hub 10b. Caged in this space and shrouded by the flange 10a is a scroll gear 14 rotatively supported on the hub 10b. The front face of the gear 14 is formed with a scroll thread.

Front member 10 is formed with three radial slots or guideways 10c 120 degrees apart around the axis of the member. The guideways are open at the front and back and each is formed with opposite side ribs 10d (see FIG. 3). Slidably fitting into each guideway is the rear portion of the body 15 of a gripper, this rear portion being provided with grooves receiving the ribs 10b of the guideway. The back of the rear portion of each gripper body 15 is formed with teeth 15a to mesh with the scroll thread on the front of the scroll gear 14. By reason of the threaded engagement between the scroll gear and the grippers, they will all be moved radially inward or radially outward upon relative rotation between the scroll gear and the chuck body, the direction of movement of the grippers being dependent on the direction of relative rotation between the scroll gear and the chuck body on which the grippers are carried for common rotation.

The bulk of each gripper body 15 extends forwardly of the chuck body. In the forwardly extending portion of the gripper body, at the radially inward end thereof, the gripper body is formed with a rectangular recess or socket 15b to receive a rectangular-bodied jaw insert 16. A cap screw 17 passes freely through a round hole in the jaw insert and is fastened into the jaw body to retain the jaw insert in the socket 15b. At the same time, the smooth stem of the cap screw permits the jaw insert to rock to a limited degree before its bottom strikes the bottom of the socket 15b. Thus the three jaw inserts can center their bite on a workpiece as the grippers close on the workpiece. The jaw inserts are readily removable and replaceable and should the jaw teeth of an insert become dull, the insert can be replaced without requiring replacement of the entire gripper unit.

Surrounding the back member 11 of the chuck body is a brake drum 20 which is secured rigidly to the back of the scroll gear 14 by a plurality of circumferentially spaced screws, of which one screw 21 appears in FIG. 2. The rear interior of the brake drum 20 is formed with integral ribs 20a to serve as hand grips by which an operator can turn the scroll gear 14 by hand for rough adjustment of the chuck jaws or grippers.

The chuck is designed to be fixedly mounted to the end of a power driven spindle 25 of a lathe or other machine. As shown, the mounting is effected by six cap screws 26 threaded into the front end of the spindle. Normally, when the machine spindle is rotating, the chuck including the carrier or chuck body 10—11, the scroll gear 14, the grippers 15—16, and the brake drum 20 all rotate as a single unit. Suitable means such as the brake shoe 28 diagrammatically indicated in FIG. 1 will be available to apply frictional braking or drag force to the periphery of the brake drum 20. While the brake shoe 28 is shown to act against the outer periphery of the drum 20 for purposes of simplicity of illustration, it is preferred that the brake shoe 28 be positioned to act against the inner circumference for protection from chips, oil or coolants.

Assuming that the machine spindle 25 is rotating the chuck body in what may be called the forward direction, the application of frictional drag force to the brake drum 20 retards and restrains the drum and the rigidly connected scroll gear 14 from following the rotation of the chuck body and the grippers rotating with the chuck body. As a result of the relative rotation in the forward direction between the chuck body with its grippers and the frictionally retarded scroll gear, the grippers are actuated radially inward to close on a workpiece. The braking force necessary to restrain the scroll gear from following rotation of the chuck body is small while the power of the spindle 25 is comparatively large and continually exerted to rotate the chuck body. Thus, the grippers will be rapidly closed into firm gripping hold on the workpiece under the power of the spindle 25 which is understood to be driven in known manner by connection to a motor (not shown). Dependent on the amount of friction applied to the brake drum, the jaws 16 will close to a greater or lesser degree of tightness on the workpiece, but sufficiently to prevent the workpiece from slipping when cutting or boring tools are applied. When the spindle is rotated in the reverse direction, its power is exerted, while the brake drum 20 and scroll gear 14 are frictionally restrained, to cause radially outward movement of the grippers so as to release the workpiece.

In the foregoing manner, the power of the machine spindle to which the chuck body is fixed is employed to actuate the chucking mechanism.

While the invention has been disclosed in a particular embodiment, it is to be understood that variations and changes such as, for example, the brake member may be made rotary so that the chuck may be non-rotary, can be made by one skilled in the art without departure from the scope of the invention, as defined in the following claims.

What is claimed is:

1. A chuck for a lathe or like machine with a power driven spindle, the chuck comprising a carrier for fixed mounting to an end of the spindle, a plurality of grippers movably mounted on the carrier around its axis for inward action toward one another to grip an object between them, a threaded device rotatively supported by the carrier and having threaded actuating connection with the plurality of grippers to effect their concurrent inward action upon relative rotation in one direction between the carrier and the threaded device, and a friction brake element in rigid connection with the threaded device to receive frictional braking force for causing slip of the threaded device relative to the carrier during rotation of the carrier by the power driven spindle, thereby to effect the inward action of the grippers for closing tightly on an object under the power of the spindle when rotating in said direction.

2. A chuck for a lathe or like machine with a power driven spindle, the chuck comprising a carrier for fixed mounting to an end of the spindle, a plurality of co-acting grippers movably mounted on the carrier equidistantly around its axis for radially inward action toward one another to grip an object between them, a threaded device rotatively supported by the carrier and having threaded actuating engagement with the plurality of grippers to effect their concurrent radially inward action upon relative rotation in one direction between the carrier and the threaded device, and a friction brake element in rigid connection with the threaded device to receive frictional braking force for detaining the device from following the rotation of the carrier by the spindle, thereby to effect the radially inward action of the grippers for closing tightly on an object under the power of the spindle when rotating in appropriate direction.

3. A scroll chuck for a lathe or like machine with a power driven spindle, the chuck comprising a carrier for fixed mounting to an end of the spindle, the carrier being provided with radial guide slots equidistantly disposed around the carrier axis, a plurality of grippers having shanks slidably fitted into the respective guide slots of the carrier to be guided thereby for radially inward action to grip an object between them, a scroll gear rotatively supported by the carrier and having a scroll thread on its front face, the gripper shanks being provided on their rear faces with teeth meshing with the scroll thread, whereby concurrent radially inward action of the grippers will be effected upon relative rotation in one direction between the carrier and the scroll gear, and a brake drum in rigid connection with the scroll gear to receive frictional braking force to restrain the scroll gear from following rotation of the carrier by the spindle, thereby to effect the radially inward action of the grippers for closing tightly on an object under the power of the spindle when rotating in appropriate direction.

4. A scroll chuck comprising a chuck body to be fixed to a power driven machine spindle, the chuck body including front and back ring members, at least one having a hub, fastened together and leaving a space between them around the hub, a scroll gear caged in said space for rotative support on the hub and having a scroll thread on the front face, the front member having radial guide slots equidistant around the axis of the chuck body, a plurality of grippers having rear elements in slidable fit with the radial slots to provide for guiding of the grippers on the front member for radially inward actuation to grip a workpiece and for radially outward actuation to release the workpiece, the rear elements of the grippers being formed on their backs with threads meshed with the scroll thread of the scroll gear, whereby relative rotation in one direction between the gear and the chuck body will produce the radially inward action of the grippers while relative rotation in reverse direction will produce the radially outward action of the grippers, and a brake drum fixed to the scroll gear to receive frictional braking force for retarding the gear from following rotation of the chuck body by the spindle, so as to produce the required relative rotation between the gear and the chuck body under the power of the spindle and in accordance with the direction of spindle rotation.

References Cited in the file of this patent

UNITED STATES PATENTS

| 1,391,908 | Segler | Sept. 27, 1921 |
| 2,855,207 | Vermette | Oct. 7, 1958 |
| 2,891,799 | Janik | June 23, 1959 |